United States Patent
Choi et al.

(10) Patent No.: US 9,908,582 B1
(45) Date of Patent: Mar. 6, 2018

(54) BICYCLE FRAME STRUCTURE HAVING REAR FRAME AND FRONT FRAME

(71) Applicant: HYUNDAI MOTOR COMPANY, Seoul (KR)

(72) Inventors: Jungnam Choi, Seongnam-si (KR); Sung Dae Lim, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/378,549

(22) Filed: Dec. 14, 2016

(30) Foreign Application Priority Data

Oct. 31, 2016 (KR) .................. 10-2016-0143464

(51) Int. Cl.
| *B62K 1/00* | (2006.01) |
| *B62K 19/20* | (2006.01) |
| *B62K 3/02* | (2006.01) |
| *B62K 19/36* | (2006.01) |
| *B62K 19/32* | (2006.01) |

(52) U.S. Cl.
CPC ............. *B62K 19/20* (2013.01); *B62K 3/02* (2013.01); *B62K 19/32* (2013.01); *B62K 19/36* (2013.01); *B60Y 2304/05* (2013.01)

(58) Field of Classification Search
CPC ........ B62K 19/06; B62K 19/18; B62K 19/20; B62K 19/36
USPC ..................................... 280/281.1
See application file for complete search history.

(56) References Cited

U.S. PATENT DOCUMENTS

| 4,699,233 A * | 10/1987 | Koga ............... B62K 11/02 180/219 |
| 5,056,704 A * | 10/1991 | Martin ............. F16L 41/082 228/173.4 |
| 5,423,564 A * | 6/1995 | Harvey ............. B62K 19/20 228/175 |
| 5,613,794 A * | 3/1997 | Isaac .............. B29C 66/742 156/148 |
| 6,340,509 B1 * | 1/2002 | Nelson ............. B29C 33/40 156/156 |
| 6,365,865 B1 * | 4/2002 | Kurokawa ......... B23K 11/002 219/59.1 |
| 8,113,530 B2 * | 2/2012 | Pierick ............ B62K 3/04 280/281.1 |
| 8,684,388 B1 * | 4/2014 | Teixeira ........... B62K 19/20 228/173.4 |

(Continued)

FOREIGN PATENT DOCUMENTS

| CN | 201951652 U | 8/2011 |
| JP | 3081345 U | 11/2001 |

(Continued)

*Primary Examiner* — Joseph M Rocca
*Assistant Examiner* — Conan D Duda
(74) *Attorney, Agent, or Firm* — McDermott Will & Emery LLP

(57) ABSTRACT

A bicycle frame structure having a rear frame and a front frame includes a rear frame of which a left stay and a right stay are bonded to each other, and an insert portion is formed at a bonded end portion, and a front frame where a head tube is formed at a front end portion thereof, an insertion hole into which the insert portion is inserted is formed at a rear end portion thereof, and the front frame is bonded to the rear frame along the circumference of the insertion hole.

11 Claims, 6 Drawing Sheets

(56) References Cited

U.S. PATENT DOCUMENTS

| | | | | |
|---|---|---|---|---|
| 8,985,608 | B2* | 3/2015 | Oikawa | B62J 35/00 280/281.1 |
| 2003/0205882 | A1* | 11/2003 | Parkin | B62K 19/16 280/281.1 |
| 2003/0234510 | A1* | 12/2003 | Ho | B62K 19/22 280/281.1 |
| 2005/0218643 | A1* | 10/2005 | Miyamoto | B62K 19/20 280/781 |
| 2005/0236204 | A1* | 10/2005 | Ishikawa | B62K 11/04 180/219 |
| 2007/0228689 | A1* | 10/2007 | Lin | B62K 3/04 280/281.1 |
| 2008/0185209 | A1* | 8/2008 | Noichi | B62K 19/20 180/311 |
| 2009/0183356 | A1* | 7/2009 | Lin | B62K 3/04 29/509 |
| 2009/0218786 | A1* | 9/2009 | Chuang | B62K 19/18 280/281.1 |
| 2011/0006501 | A1* | 1/2011 | Guzik | B62K 19/16 280/274 |
| 2011/0049832 | A1 | 3/2011 | D'Aluisio | |
| 2011/0278816 | A1* | 11/2011 | Chamberlain | B21C 37/29 280/281.1 |
| 2012/0038129 | A1 | 2/2012 | D'Aluisio et al. | |
| 2014/0175771 | A1* | 6/2014 | Yu | B62K 19/36 280/288.3 |
| 2015/0048588 | A1* | 2/2015 | Choi | B21D 53/86 280/288.3 |
| 2015/0048589 | A1* | 2/2015 | Choi | B62K 19/20 280/288.3 |
| 2015/0048591 | A1* | 2/2015 | Choi | B21D 53/86 280/288.3 |

FOREIGN PATENT DOCUMENTS

| | | |
|---|---|---|
| JP | 2011-230610 A | 11/2011 |
| KR | 10-2011-0037715 A | 4/2011 |
| KR | 10-1542959 B1 | 8/2015 |
| KR | 10-1556384 B1 | 9/2015 |

* cited by examiner

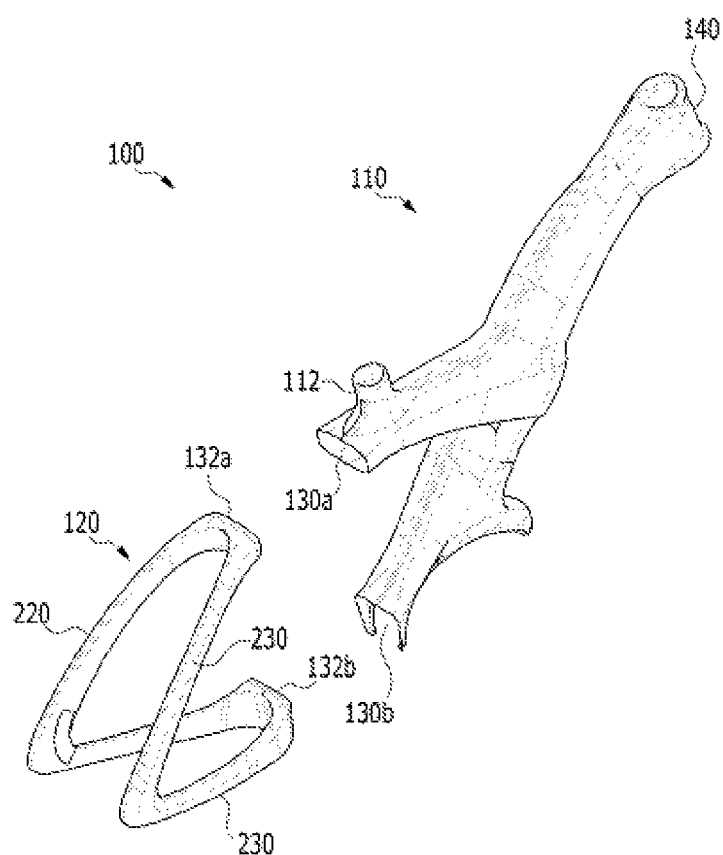
[FIG. 1]

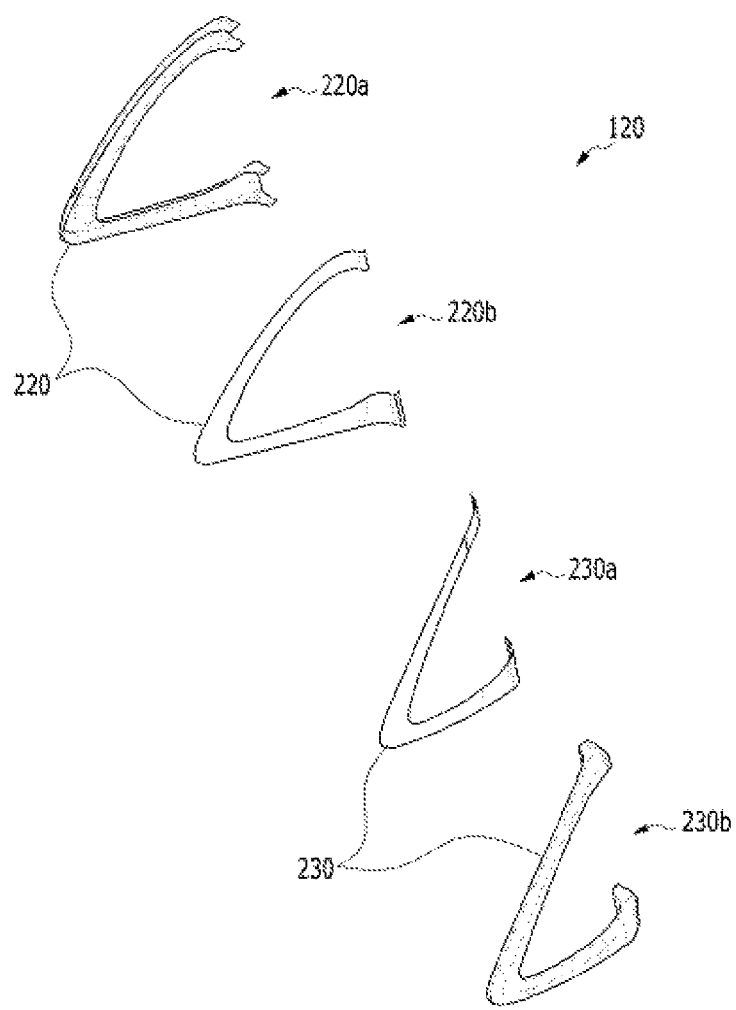

[FIG. 3]
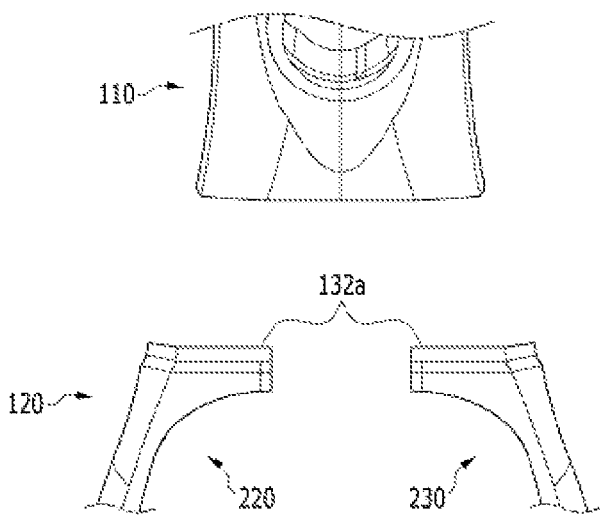
[FIG. 4]
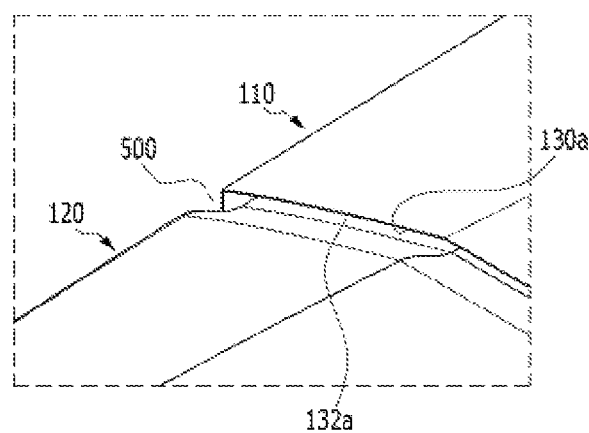

[FIG. 5]
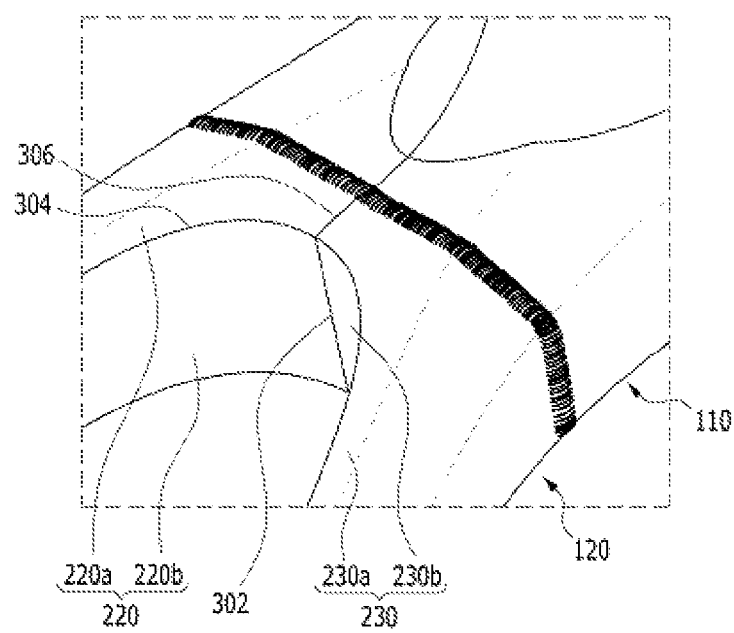

【FIG. 6A】
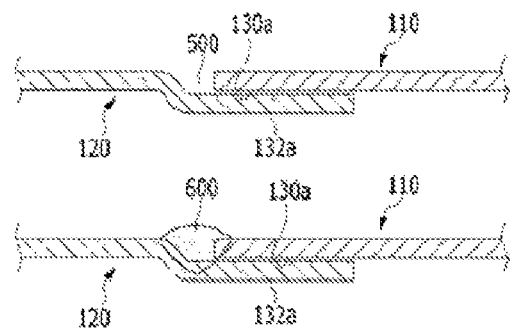
【FIG. 6B】
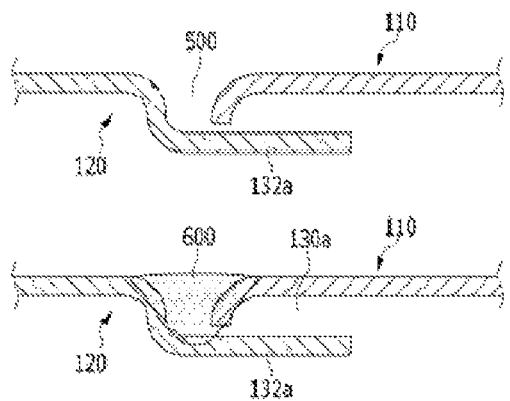

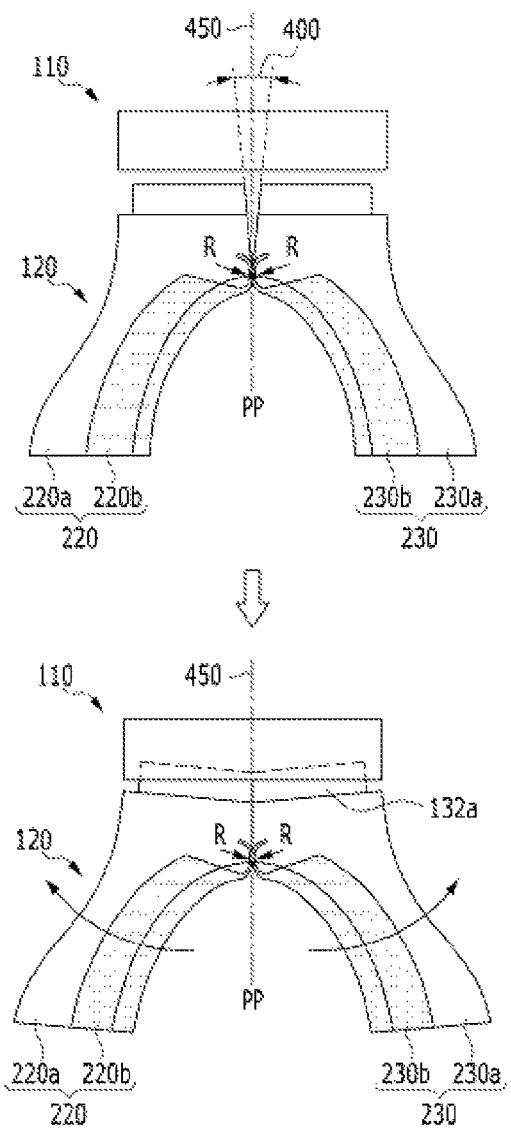

BICYCLE FRAME STRUCTURE HAVING REAR FRAME AND FRONT FRAME

CROSS-REFERENCE TO RELATED APPLICATION

This application claims the benefit of priority to Korean Patent Application No. 10-2016-0143464, filed with the Korean Intellectual Property Office on Oct. 31, 2016, the entire contents of which are incorporated herein by reference.

TECHNICAL FIELD

The present disclosure relates to a bicycle frame structure having a rear frame and a front frame, and having a structure in which a left panel and a right panel are stamped and bonded to each other.

BACKGROUND

A conventional bicycle frame is composed of a head tube, a seat tube, a down tube, a seat stay and a chain stay.

That is, the head tube is connected to a steering handle connector at an upper end thereof, and connected to a front wheel rotation connector at a lower end thereof. The seat tube is connected to a saddle connector at an upper end thereof and connected to a chain driver, or crankset, at a lower end thereof.

The top tube and the down tube connect the head tube and the seat tube to support these elements, and the seat stay and the chain stay connect a rear wheel rotation connector and the seat tube to support these elements.

Recently, bicycle frames have been made through stamping forming of left and right panels and then bonding the panels. In the stamping frame, one drawback is the increase in production costs in order to produce various sizes of frames.

Therefore, research for reducing production costs has facilitated making a front triangle portion (front frame) using a mold and making a rear triangle portion (rear frame) in one size for common use.

Furthermore, since correction operations for keeping the angle between the left and right stays constant due to thermal deformation in the bonding portion of the stamping frames may be performed, productivity may be reduced.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a bicycle frame structure with a rear frame and a front frame capable of using a stay part (a rear triangle portion or a rear frame) for common use, making a front triangle portion (a front frame) by size and improving the connecting structure of a front frame and a rear frame.

A bicycle frame structure with a rear frame and a front frame according to exemplary embodiments of the present disclosure may include a rear frame of which a left stay and a right stay are bonded to each other, and an insert portion is formed at a bonded end portion; and a front frame that a head tube is formed at an front end portion thereof, an insertion hole into which the insert portion is inserted is formed at a rear end portion thereof, and bonded to the rear frame along the circumference of the insertion hole.

The rear frame and the front frame may be formed so that a predetermined gap is formed between an interior circumference of the insertion hole and an exterior circumference of the insert portion.

A rear end portion of the front frame may be inwardly bent toward an exterior surface of the insert portion in order to correspond to an inlet of the insertion hole.

The left stay may include a left stay outer panel disposed towards an outer direction; and a left stay inner panel disposed towards an inner direction and bonded to the left stay outer panel inwardly.

The right stay may include a right stay outer panel disposed towards an outer direction; and a right stay inner panel disposed towards an inner direction and bonded to the right stay outer panel inwardly.

A first bonding portion may be formed between the left stay inner panel and the right stay inner panel along a central axis between the left stay and the right stay; and a second bonding portion connected with an upper end portion or a lower end portion of the first bonding portion, may be formed between the left stay outer panel and the left stay inner panel.

A third bonding portion connected with the upper end portion or the lower end portion of the first bonding portion may be formed between the right stay outer panel and the right stay inner panel.

A first bonding portion where the left stay inner panel and the right stay inner panel may be bonded to each other along a central axis between the left stay and the right stay; end portions corresponding to the central axis may be bent to have a first predetermined radius along the first bonding portion in the left stay inner panel and the right stay inner panel, respectively; and the bent portions having the first radius are line-contacted with each other to form a pivot point.

The left stay outer panel and the right stay outer panel may be trimmed along a trim region which is gradually formed forward from the pivot point at a predetermined angle in order that the angles of the left stay and the right stay are adjusted around the pivot point within a predetermined angle and then bonded to each other.

A third bonding portion connected with the upper end portion or the lower end portion of the first bonding portion, may be formed along the trim region between the left stay outer panel and the right stay outer panel.

The left stay may include a seat stay and a chain stay connected with a rear end portion of the seat stay.

The insert portion may include an upper insert portion corresponding to the seat stay and a lower insert portion corresponding to the chain stay.

The insertion hole may include an upper insertion hole corresponding to the upper insert portion, and a lower insertion hole corresponding to the lower insert portion.

The front frame may include a left panel disposed on the left, and a right panel bonded to the left panel so as to form a pipe structure.

According to the present disclosure, the disclosure is able to reduce total production costs by using the rear frame for common use, making the front frame by size and bonding the front frame and the rear frame according to specification, and improve the productivity and rigidity of the frame by improving the connection structure between front frame and the rear frame.

BRIEF DESCRIPTION OF THE DRAWINGS

FIG. 1 is an exploded perspective view a bicycle frame structure with a front frame and a rear frame according to exemplary embodiments of the present disclosure.

FIG. 2 is an exploded perspective view of a rear frame in a bicycle frame structure with a front frame and a rear frame according to exemplary embodiments of the present disclosure.

FIG. 3 is a partial exploded top plan view showing a connection portion between a front frame and a rear frame in a bicycle frame structure with a front frame and a rear frame according to exemplary embodiments of the present disclosure.

FIG. 4 is a partial perspective view showing a connection portion between a front frame and a rear frame before welding according to exemplary embodiments of the present disclosure.

FIG. 5 is a partial perspective view showing a connection portion between a front frame and a rear frame after welding according to exemplary embodiments of the present disclosure.

FIG. 6A and FIG. 6B are partial cross-sectional views showing a connection portion between a front frame and a rear frame before welding according to exemplary embodiments of the present disclosure.

FIG. 7 is a partial top plan view showing a connection structure and method of a front frame and a rear frame according to exemplary embodiments of the present disclosure.

DETAILED DESCRIPTION

Hereinafter, exemplary embodiments of the present disclosure will be described with reference to accompanying drawings.

Since the sizes and thicknesses of components illustrated in the drawings may be arbitrarily set for convenience of description, the present disclosure is not limited to those illustrated in the drawings, but the thicknesses of the components are expanded to clarify a plurality of parts and regions.

In order to clearly describe the exemplary embodiments of the present disclosure, parts having no relation to the description will be omitted. Throughout the entire specification, like reference numerals will be given to the same or similar elements.

In the following descriptions, terms such as first and second are used to distinguish elements from each other because the elements have the same name, and the order of the terms is not limited thereto.

FIG. 1 is an exploded perspective view a bicycle frame structure with a front frame and a rear frame according to exemplary embodiments of the present disclosure.

Referring to FIG. 1, a bicycle frame 100 may include a front frame 110 and a rear frame 120, a head tube 140 may be vertically formed at an end portion of the front frame 110, and an upper insertion hole 130a and a lower insertion hole 130b may be formed at an upper portion and a lower portion of a rear end portion of the front frame 110.

A seat tube 112 may be upwardly integrally formed at a front upper surface of the upper insertion hole 130a.

The front frame 110 may have a pipe type structure formed by bonding predetermined, or prefabricated, formed left and right panels.

The rear frame 120 may include a left stay 220 and a right stay 230, and the left stay 220 and the right stay 230 may include a chain stay (reference numeral not shown) and a seat stay (reference numeral not shown), respectively.

An upper insert portion 132a may be formed at an upper portion of the end portion in the rear frame 120, and a lower insert portion 132b may be formed at a lower portion of the end portion in the rear frame 120. The upper insert portion 132a is inserted into, and bonded to, the upper insertion hole 130a, and the lower insert portion 132b is inserted into, and bonded to, the lower insertion hole 130b.

The upper insert portion 132a and the lower insert portion 132b may be formed by reducing the outer diameter of the pipe type end portion in the rear frame 120.

In the exemplary embodiments of the present disclosure, the rear frame 120 may be made for common use, or for a single size, and the front frame may be applied according to specifications, or a plurality of sizes, thereby improving frame productivity, reducing production costs and easily making various shapes and sizes of bicycle frames.

FIG. 2 is an exploded perspective view of a rear frame in a bicycle frame structure with a front frame and a rear frame according to exemplary embodiments of the present disclosure.

Referring to FIG. 2, the rear frame 120 may include a left stay 220 and a right stay 230. The left stay 220 may include a left stay outer panel 220a and a left stay inner panel 220b, and the right stay 230 may include a right stay outer panel 230b and a right stay inner panel 230a.

The left stay outer panel 220a and the left stay inner panel 220b may be bonded to each other, the right stay outer panel 230b and the right stay inner panel 230a may be also bonded to each other, and end portions of the left stay 220 and the right stay 230 may be bonded to each other to form the rear frame 120.

FIG. 3 is a partial exploded top plan view showing the connection portion between the front frame and the rear frame in s bicycle frame structure with a front frame and a rear frame according to exemplary embodiments of the present disclosure.

Referring to FIG. 3, the upper insert portion 132a may be formed at the end portions of the left stay 220 and the right stay 230 in the rear frame 120, respectively.

The upper insert portions 132a and the lower insert portion 132b formed at the end portions of the right stay 230 and the left stay 220 are bonded to each other, and then inserted into the insertion holes 130a, 130b so that the rear frame 120 and the front frame 110 are bonded to each other.

FIG. 4 is a partial perspective view showing a connection portion between a front frame and a rear frame before welding according to exemplary embodiments of the present disclosure.

Referring to FIG. 4, the upper insert portion 132a or the lower insert portion 132b of the rear frame 120 is inserted into the insertion hole 130a or the insertion hole 130b of the front frame 110, and then a welding groove 500 is formed along a circumference thereof.

FIG. 5 is a partial perspective view showing a connection portion between a front frame and a rear frame after welding according to exemplary embodiments of the present disclosure.

Referring to FIG. 5, a first bonding portion 302 may be formed between the left stay inner panel 220b and the right stay inner panel 230a, a second bonding portion 304 may be formed between the left stay outer panel 220a and the left stay inner panel 220b, and a third bonding portion 306 may be formed between the left stay outer panel 220a and the right stay outer panel 230b along a central axis 450 (as shown in FIG. 7).

That is, the rear frame 120 may be completed through the first bonding portion 302, the second bonding portion 304 and the third bonding portion 306. At this state, the upper insert portion 132a or the lower insert portion 123b of the rear frame 120 is inserted into the insertion hole 130a or the insertion hole 130b of the front frame 110, and then the rear frame 120 and the front frame 110 are bonded to each other along the circumference thereof.

FIG. 6 is a partial cross-sectional view showing a connection portion between a front frame and a rear frame before welding according to exemplary embodiments of the present disclosure.

Referring to FIG. 6A, the insert portion 132a, or 132b of the rear frame 120 is inserted into the insertion hole 130a, or 132b of the front frame 110, along the circumference, the welding groove 500 is formed, and at this portion, a welding portion 600 is formed. A predetermined gap may be formed between an interior circumference of the insertion hole 130a or 130b and an exterior circumference of the insert portion 132a or 132b.

Referring to FIG. 6B, the insert portion 132a or 132b of the rear frame 120 is inserted into the insertion hole 130a or 132b of the front frame 110, along the circumference, the welding groove 500 is formed, and at this portion, a welding portion 600 is formed. The rear end portion of the front frame 110 is bent toward a central portion of the insertion hole 130a or 103b so that the depth of the welding groove 500 is increased.

FIG. 7 is a partial top plan view showing a connection structure and method of a front frame and a rear frame according to exemplary embodiments of the present disclosure.

Referring to FIG. 7, the first bonding portion (302 shown in FIG. 5) at which the left stay inner panel 220b and the right stay inner panel 230a are bonded to each other, is formed along the central axis 450 between the left stay 220 and the right stay 230, and the end portions corresponding to the central axis 450 is bent to be formed at the left stay inner panel 220b and the right stay inner panel 230a along the first bonding portion 302 so as to have a first predetermined radius R, respectively.

The bent portions having the first radius R are line-contacted with each other to form a pivot point pivot PP.

The left stay outer panel 220a and the right stay outer panel 230b are trimmed along a trim region 400 which is formed forward at a predetermined angle from the pivot point PP, the left stay 220 the right stay 230 are bonded to each other after adjusting the angles of the left stay 220 the right stay 230 around the pivot point PP within a predetermined angle range.

While this disclosure has been described in connection with what is presently considered to be exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A bicycle frame structure having a rear frame and a front frame, comprising:
the rear frame of which a left stay and a right stay are bonded to each other, and an insert portion is formed at a bonded end portion; and
the front frame where a head tube is formed at a front end portion thereof, an insertion hole into which the insert portion is inserted is formed at a rear end portion thereof, and the front frame is bonded to the rear frame along the circumference of the insertion hole,
wherein the left stay comprises:
a left stay outer panel disposed towards an outer direction, and
a left stay inner panel disposed towards an inner direction and bonded to the left stay outer panel inwardly;
wherein a right stay comprises:
a right stay outer panel disposed towards the outer direction, and
a right stay inner panel disposed towards the inner direction and bonded to the right stay outer panel inwardly;
wherein the bicycle frame structure further comprises a first bonding portion where the left stay inner panel and the right stay inner panel are bonded to each other along a central axis between the left stay and the right stay,
wherein end portions corresponding to the central axis are bent to have a first predetermined radius along the first bonding portion in the left stay inner panel and the right stay inner panel, respectively, and
wherein the bent portions of the end portions having the first radius are line-contacted with each other to form a pivot point.

2. The bicycle frame structure with the rear frame and the front frame of claim 1, wherein:
the rear frame and the front frame are formed so that a predetermined gap is formed between an interior circumference of the insertion hole and an exterior circumference of the insert portion.

3. The bicycle frame structure with the rear frame and the front frame of claim 1, wherein:
the rear end portion of the front frame is inwardly bent toward an exterior surface of the insert portion and corresponds to an inlet of the insertion hole.

4. The bicycle frame structure with the rear frame and the front frame of claim 1, wherein:
a second bonding portion, connected with an upper end portion or a lower end portion of the first bonding portion, is formed between the left stay outer panel and the left stay inner panel.

5. The bicycle frame structure with the rear frame and the front frame of claim 4, wherein:
a third bonding portion, connected with the upper end portion or the lower end portion of the first bonding portion, is formed between the right stay outer panel and the right stay inner panel.

6. The bicycle frame structure with the rear frame and the front frame of claim 1, wherein:
the left stay outer panel and the right stay outer panel are trimmed along a trim region which is gradually formed forward from the pivot point at a predetermined angle such that the angles of the left stay and the right stay are adjusted around the pivot point within the predetermined angle and then bonded to each other.

7. The bicycle frame structure with the rear frame and the front frame of claim 6, wherein:
a third bonding portion, connected with an upper end portion or a lower end portion of the first bonding portion, is formed along the trim region between the left stay outer panel and the right stay outer panel.

8. The bicycle frame structure with the rear frame and the front frame of claim 1, wherein the left stay comprises:
a seat stay; and
a chain stay connected with a rear end portion of the seat stay.

9. The bicycle frame structure with the rear frame and the front frame of claim 8, wherein the insert portion comprises:

an upper insert portion corresponding to the seat stay; and a lower insert portion corresponding to the chain stay.

10. The bicycle frame structure with the rear frame and the front frame of claim 9, wherein the insertion hole comprises:

an upper insertion hole corresponding to the upper insert portion; and a lower insertion hole corresponding to the lower insert portion.

11. The bicycle frame structure with the rear frame and the front frame of claim 1, wherein the front frame comprises:

a left panel disposed on a left side of the front frame; and a right panel bonded to the left panel so as to form a pipe structure.

* * * * *